US006555045B2

(12) United States Patent
McClure et al.

(10) Patent No.: US 6,555,045 B2
(45) Date of Patent: *Apr. 29, 2003

(54) GROOVED MOLD APPARATUS AND PROCESS FOR FORMING FIBER REINFORCED COMPOSITE STRUCTURES

(75) Inventors: Edward Norman McClure, Torrance, CA (US); Steven Alan Jackson, Paramount, CA (US); Philip J. Sweesy, Carson, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 128 days.

(21) Appl. No.: 09/228,434

(22) Filed: Jan. 11, 1999

(65) Prior Publication Data

US 2001/0009313 A1 Jul. 26, 2001

(51) Int. Cl.[7] ............................................... B29C 44/42
(52) U.S. Cl. ...................... 264/510; 264/571; 264/316; 425/389; 425/405.1
(58) Field of Search ................................ 264/316, 571, 264/510; 425/389, 405.1, 112

(56) References Cited

U.S. PATENT DOCUMENTS

| 2,913,036 | A | | 11/1959 | Smith .......................... 154/1.6 |
|---|---|---|---|---|
| 3,146,148 | A | | 8/1964 | Mitchella et al. ........... 156/382 |
| 4,132,755 | A | | 1/1979 | Johnson ....................... 264/553 |
| 4,280,804 | A | | 7/1981 | Holland ....................... 425/388 |
| 4,312,829 | A | * | 1/1982 | Fourcher ...................... 264/571 |
| 4,359,437 | A | | 11/1982 | Le Comte .................... 264/102 |
| 4,560,523 | A | | 12/1985 | Plumley et al. ............. 264/102 |
| 4,676,041 | A | | 6/1987 | Ford ......................... 52/309.11 |
| 4,780,262 | A | | 10/1988 | Von Volkli ................... 264/512 |
| 4,824,017 | A | | 4/1989 | Mansfield ........................ 239/9 |
| 4,854,504 | A | | 8/1989 | Hedger, Jr. et al. .......... 239/294 |
| 4,873,044 | A | * | 10/1989 | Epel .......................... 425/405.1 |
| 4,902,215 | A | | 2/1990 | Seemann, III ............... 425/406 |
| 4,942,013 | A | | 7/1990 | Palmer et al. ............... 264/511 |
| 4,975,311 | A | * | 12/1990 | Lindgren .................. 425/405.1 |
| 5,000,990 | A | | 3/1991 | Freeman ..................... 428/36.1 |
| 5,009,821 | A | | 4/1991 | Weaver ......................... 265/22 |
| 5,035,602 | A | | 7/1991 | Johnson ....................... 425/468 |
| 5,041,260 | A | | 8/1991 | Johnson et al. ............. 264/510 |
| 5,045,251 | A | | 9/1991 | Johnson et al. ............. 264/40.1 |

(List continued on next page.)

OTHER PUBLICATIONS

Abstract: E. Mcclure Notes:*Recirculation Molding* Feb. 24, 1998.

Article: Scott M. Lewit and John C. Jakabowski, Structural Composites, Inc. and Navy CECMT Marine Composites Technology Center *Recireulation Molding–Recent Advances in Applications and Equipment* pp. 1–22.

Article: Gerry Kobe *Chrysler Molds The Future* Manufacturing pp. 58–60 Nov. 1997.

Primary Examiner—W. L. Walker
Assistant Examiner—Thu Khanh T. Nguyen
(74) Attorney, Agent, or Firm—Stetina Brunda Garred & Brucker

(57) ABSTRACT

In accordance with the present invention, there is provided a process for forming a fiber-reinforced resin structure against a mold surface by vacuum bag forming. The process includes grooving the mold surface to form resin distribution conduits therein. A fiber-reinforced ply is distributed adjacent the mold surface. A flexible covering is placed over the fiber-reinforced ply and the mold surface to form a chamber therebetween. The chamber is evacuated. Resin is dispensed into the evacuated chamber such that the resin enters the resin distribution conduits and is thereby distributed about the ply.

19 Claims, 3 Drawing Sheets

U.S. PATENT DOCUMENTS

| | | | |
|---|---|---|---|
| 5,052,906 A | 10/1991 | Seemann | 425/112 |
| 5,096,651 A | 3/1992 | Le Comte | 264/510 |
| 5,132,069 A | 7/1992 | Newton | 264/257 |
| 5,169,571 A | 12/1992 | Buckley | 264/22 |
| 5,183,619 A | 2/1993 | Tolton | 264/257 |
| 5,215,322 A | 6/1993 | Enders | 280/231 |
| 5,242,652 A * | 9/1993 | Savigny | 264/510 |
| 5,266,139 A | 11/1993 | Yokota et al. | 156/169 |
| 5,275,372 A | 1/1994 | Boeckeler | 249/134 |
| 5,281,388 A | 1/1994 | Palmer et al. | 264/571 |
| 5,298,212 A | 3/1994 | Stecker | 264/571 |
| 5,316,462 A | 5/1994 | Seemann | 425/112 |
| 5,322,665 A | 6/1994 | Bernardon et al. | 264/571 |
| 5,388,768 A | 2/1995 | Moses | 239/417 |
| 5,403,537 A | 4/1995 | Seal et al. | 264/511 |
| 5,407,610 A | 4/1995 | Kohama et al. | 264/22 |
| 5,432,010 A | 7/1995 | Ko et al. | 428/542.8 |
| 5,439,635 A | 8/1995 | Seemann | 264/510 |
| 5,480,603 A | 1/1996 | Lopez et al. | 264/131 |
| 5,484,277 A | 1/1996 | Lindsay | 425/388 |
| 5,500,164 A | 3/1996 | Livesay et al. | 264/459 |
| 5,516,271 A | 5/1996 | Swenor et al. | 425/127 |
| 5,540,497 A | 7/1996 | Addeo et al. | 366/159.1 |
| 5,549,246 A | 8/1996 | Kukesh | 239/9 |
| 5,576,030 A | 11/1996 | Hooper | 425/112 |
| 5,588,392 A | 12/1996 | Bailey | 114/357 |
| 5,601,852 A * | 2/1997 | Seemann | 264/571 |
| 5,639,027 A | 6/1997 | Fritz | 239/414 |
| 5,641,525 A | 6/1997 | Yakel | 425/390 |
| 5,665,301 A | 9/1997 | Alanko | 264/571 |
| 5,678,591 A | 10/1997 | Merrifield et al. | 137/208 |
| 5,702,663 A | 12/1997 | Seemann | 264/510 |
| 5,716,488 A * | 2/1998 | Bryant | 425/389 |
| 5,721,034 A | 2/1998 | Seemann, III et al. | 428/71 |
| 5,733,494 A | 3/1998 | Moore | 264/258 |
| 5,741,450 A | 4/1998 | Monroe | 264/102 |
| 5,939,013 A * | 8/1999 | Han et al. | 425/389 |
| 5,958,325 A * | 9/1999 | Seeman, III et al. | 264/510 |

\* cited by examiner

GROOVED MOLD APPARATUS AND PROCESS FOR FORMING FIBER REINFORCED COMPOSITE STRUCTURES

FIELD OF THE INVENTION

The present invention relates generally to fiber-reinforced resin structures, and more particularly to an apparatus used to fabricate a fiber-reinforced resin structure using a mold having a grooved surface, and the method of using the same.

BACKGROUND OF THE INVENTION

Vacuum assisted resin transfer molding (VARTM) and related processes and techniques have been widely used to fabricate relatively large fiber-reinforced composite articles. Such articles may include coach chassis for buses and trailers and fiber glass boat hulls, for example.

In general, the VARTM process includes the distribution of dry, fiber strips, plies or mats about the surface of a female mold to form a fiber lay-up of a desired thickness. The fiber strips or plies may take the form of a cloth or sheet of fibers of glass, carbon or other suitable material. In addition, one or more rigid core layers may be included. The core layers may be formed of a solid foam material or balsa wood. The core layers may be sandwiched between the fiber plies to form a fiber/core composite lay-up or laminate.

A flexible, fluid impermeable bag or sheet is positioned atop the exposed lay-up and sealed about the periphery thereof. A relative vacuum is drawn between the mold and the bag, thereby causing the bag to compress against the fiber lay-up. A chemically catalyzed liquid resin is introduced into the evacuated bagged mold through a series of resin supply lines or conduits. A multitude of individual resin supply lines may be used so as to facilitate distributed wetting or infusion of the liquid resin about the fiber lay-up. The vacuum source and resin supply lines are strategically positioned relative to one another in a manner which encourages controlled wetting. In this respect, the vacuum source may be applied at one side of the fiber lay-up and the resin introduced at an opposing side, and thus tending to cause the resin to be pulled across and wet portions of the fiber lay-up therebetween.

Underwetting and overwetting of the fiber lay-up are particularly problematic, as such conditions may result unacceptable structural weaknesses and deficiencies of the resultant article. In addition, nonuniform resin distribution may also result unacceptable structural weaknesses and deficiencies of the resultant article.

Contemporary techniques for facilitating more uniformed or homogeneous resin distribution include the use of cloth material adjacent the fiber lay-up. The cloth forms a screen or matrix of open spaces which tends to wick the resin, and thereby facilitates resin flow. The cloth is removed or peeled away prior to the resin fully curing. Other techniques for enhancing more uniformed resin distribution focus on the resin delivery apparatus, such as specially formed resin supply conduit manifolds and manifolds which are integrated into the vacuum bag itself. While these and other techniques enhance the distribution of resin about the fiber lay-up, they each require the positioning and application of a particular type of cloth or conduit manifold or the like, each time the article is formed. In addition, specialized procedures for disposal and/or clean-up of such additional apparatus must be addressed as well. As such, use of such apparatus increases the time and skill requirements in order to fabricate a resultant article to desired quality control standards.

Where resin overwetting is detected prior to the resin curing, excess resin may be removed via skilled labor intensive steps. Where underwetting is detected in a cured lay-up, the structure may be required to undergo additional processing in the form of reinfusion of liquid resin and subsequent curing of the resin. While such labor intensive steps, including inspection tasks, may result in a structure which conforms to desired mechanical requirements, such a process so limits the production efficiency so as to make the process economically nonfeasible.

As such, based upon the foregoing, there exists a need in the art for an improved method and device, for enhancing resin distribution in comparison to the prior art.

SUMMARY OF THE INVENTION

In accordance with the present invention, there is provided a process for forming a fiber-reinforced resin structure against a mold surface of a rigid mold by vacuum bag forming. The process includes grooving the mold surface of the rigid mold to form resin distribution conduits therein. A fiber-reinforced ply is distributed adjacent the mold surface. A flexible covering is placed over the fiber-reinforced ply and the rigid mold to form a chamber therebetween. The chamber is evacuated. Resin is dispensed into the evacuated chamber such that the resin enters the resin distribution conduits and is thereby distributed about the ply. After the resin is distributed about the ply, the resin is allowed to cure to form a resultant fiber-reinforced resin structure.

In another embodiment of the present invention, there is provided an improvement for an apparatus or tool used in the forming of fiber-reinforced resin structures as described in the above process. The apparatus is provided with a flexible covering and a mold surface which is formed to support a fiber-reinforced ply thereon and over which the covering may be placed to form a chamber therebetween. A vacuum port is further provided for evacuating the chamber to collapse the covering against the ply and the mold surface. The apparatus improvement comprises a plurality of resin distribution conduits formed in the mold surface for distributing the resin about the ply when the resin is dispensed into the evacuated chamber. In this respect, the resin distribution conduits may take the form of straight grooves which are formed to intersect one another in a criss-crossed or grid-like pattern. In the preferred embodiment, at least one of the resin distribution conduits is disposed adjacent a resin port and at least one is disposed adjacent a vacuum port.

The apparatus improvement constructed in accordance with the present invention and the process of fabricating fiber-reinforced structures using the same presents numerous advantages not found in the related prior art. In this respect, the present invention is particularly adapted to provide enhanced resin distribution by the incorporation of the resin distribution conduits or grooves about the mold surface. Such enhanced resin distribution tends to increase the structural integrity of the resultant fiber-reinforced resin structures and reduce the time and skill fabrication requirements. As such, the resultant structures can be produced at rates which make the technology more economically viable.

As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
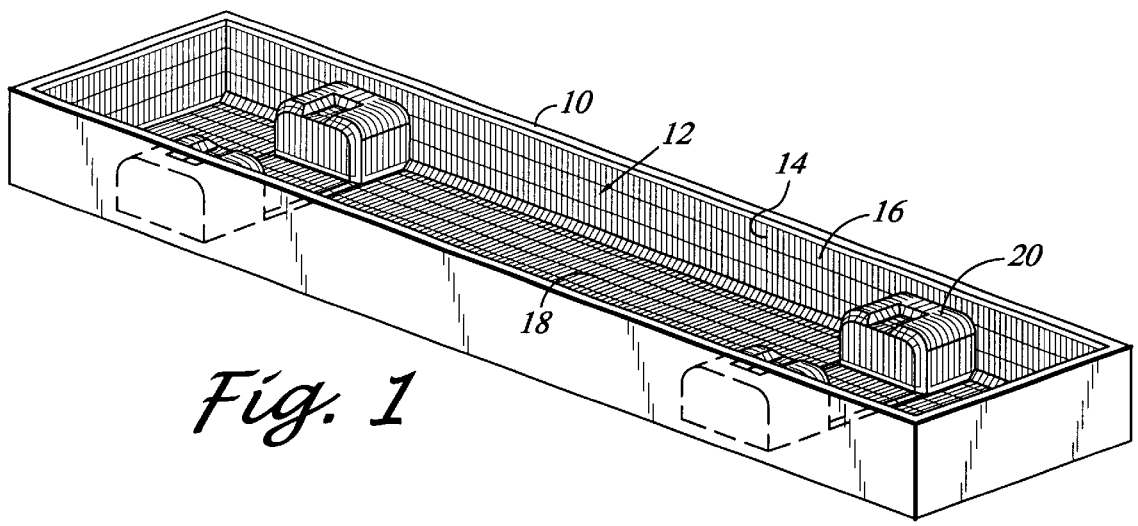
FIG. 1 is a perspective view of an improved mold apparatus of the present invention.

Referring now to the drawings wherein the showings are for purposes of illustrating a preferred embodiment of the present invention only, and not for purposes of limiting the same, FIGS. 1–7 illustrate an apparatus and process for forming a fiber-reinforced resin structure.

Figure 2:
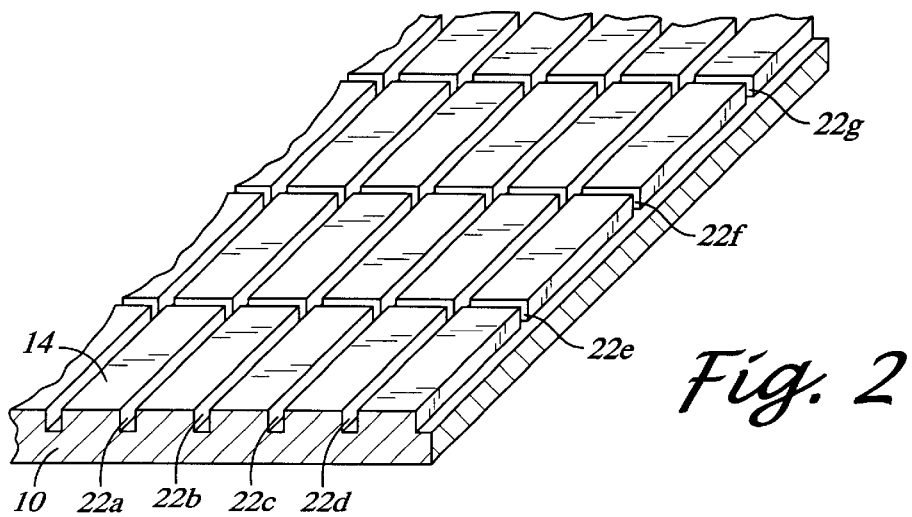
FIG. 2 is an enlarged exploded view of a portion of the improved mold apparatus of FIG. 1.
Figure 3:
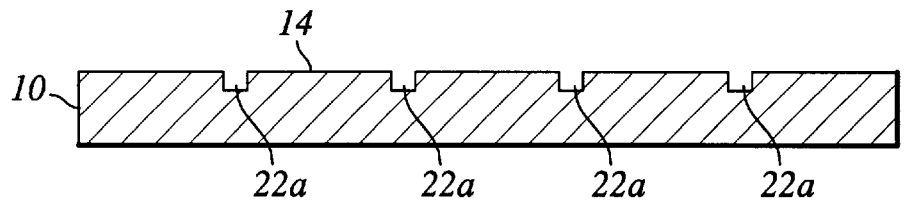
FIG. 3 is a cross-sectional view of a portion of the improved apparatus of the present invention.

Referring now to FIGS. 1–3, there is depicted a mold 10 which is used to fabricate fiber-reinforced resin structures. The mold 10 generally defines a mold cavity 12 and has a mold surface 14. The mold 10 is sized and configured to conform to the shape of a desired resultant resin composite product. In this respect, the mold 10 is symbolically representative. As illustrated, the mold 10 is depicted to conform to the geometry of a bus lower chassis, and is therefore provided with wall, floor and wheel well portions 16, 18, 20. As such, it is observed that the mold surface 14 has regions which are aligned to be horizontal, vertical and at other angular orientations. Further, it is contemplated that the mold surface 14 may have generally planar portions, as well as those which are curved or irregularly shaped.

Importantly, the mold surface 14 is grooved to form a plurality of unobstructed resin distribution conduits 22 therein. As further discussed below, the resin distribution conduits 22 are formed to receive liquid resin therein and facilitate the migration or flow of the resin about the mold surface 14 within the resin distribution conduits in an uninterrupted pattern. It is contemplated that the method and apparatus used to form the resin distribution conduits 22 in the mold surface 14 are chosen from those which are well known to one of ordinary skill in the art.

Preferably, the resin distribution conduits 22 comprise substantially straight grooves as depicted, however, the resin distribution conduits 22 may be curved or irregularly shaped or have portions thereof which are curved or irregularly shaped. The resin distribution conduits 22 may have any cross-sectional shape, and may include those which are rectangular (as depicted) and rounded, for example. In addition, the resin distribution conduits 22 are preferably formed to be approximately three-eighths inches deep.

The resin distribution conduits 22 are formed to intersect one another in a criss-crossed or grid-like pattern (as best shown in FIG. 2). In this respect, a portion of the resin distribution conduits 22a–d are aligned parallel and in spaced relation to one another. Transversely aligned to this portion of the resin distribution conduits 22a–d are other resin distribution conduits 22e–g. While resin distribution conduits 22a–d are depicted to be perpendicular to resin distribution conduits 22e–g, other angular orientations are contemplated. Preferably, the resin distribution conduits 22 which are similarly aligned are spaced approximately six inches apart. The resin distribution conduits 22 need not be uniformly spaced from one another, and may be variably spaced from one another about the mold surface 14 or selectively about localized portions thereof.

As will be appreciated by one of ordinary skill in the art, the particular sizing, spacing and configuration of the resin distribution conduits 22 are a function of the a variety of factors which include the local geometry and orientation of the mold surface 14, the density, thickness and nature of the adjacent fiber-reinforced plies, the resin viscosity and environmental conditions (including temperature).

Figure 4:
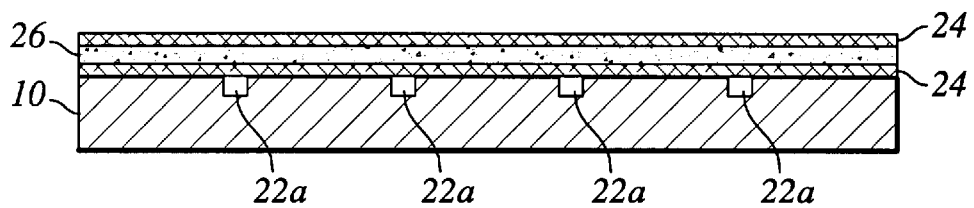
FIG. 4 is the improved apparatus of FIG. 3 shown with a fiber/core lay-up.

In practice, the VARTM process of forming fiber-reinforced resin structures begins with the distribution of fiber-reinforced plies 24 about the mold surface 14, as symbolically depicted in FIG. 4. The fiber-reinforced plies 24 take the form of a cloth or sheet of fibers of glass, carbon or other suitable materials which are well known to one of ordinary skill in the art. In addition, one or more rigid core layers 26 may be included. The core layers 26 may be formed of a solid foam material, balsa wood or other suitable materials which are well known to one of ordinary skill in the art. The core layers 26 may be sandwiched between the fiber-reinforced plies 24 to form a fiber/core composite lay-up or laminate. Where the core layers 26 are not included, the fiber-reinforced plies 24 form a solid fiber or solid glass section thereat. The fiber-reinforced plies 24 and core layers 26 are applied to a desired thickness. It is contemplated that the mold 10 and mold surface 14 are of such structural integrity so as to be supportive the fiber-reinforced plies 24 and core layers 26.

Figure 5:
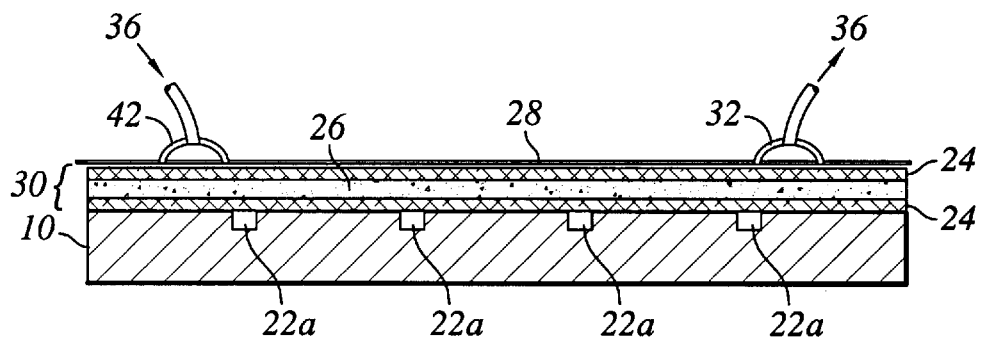
FIG. 5 is the improved apparatus of FIG. 4 shown with a flexible covering and resin and vacuum ports.
Figure 6:
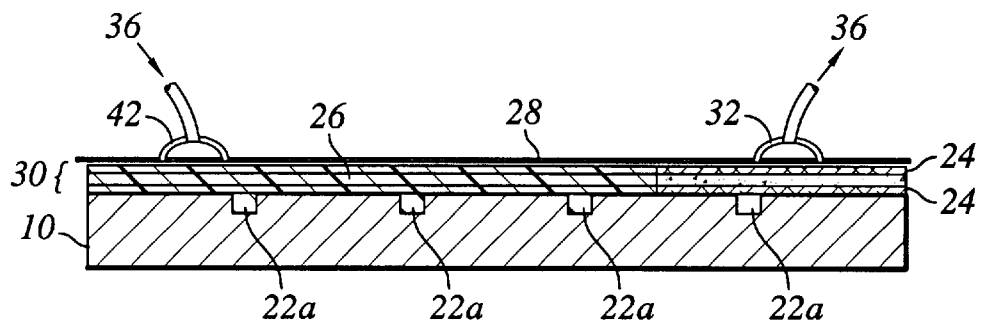
FIG. 6 is the improved apparatus of FIG. 5 shown with the introduction of resin into the fiber/core lay-up.
Figure 7:
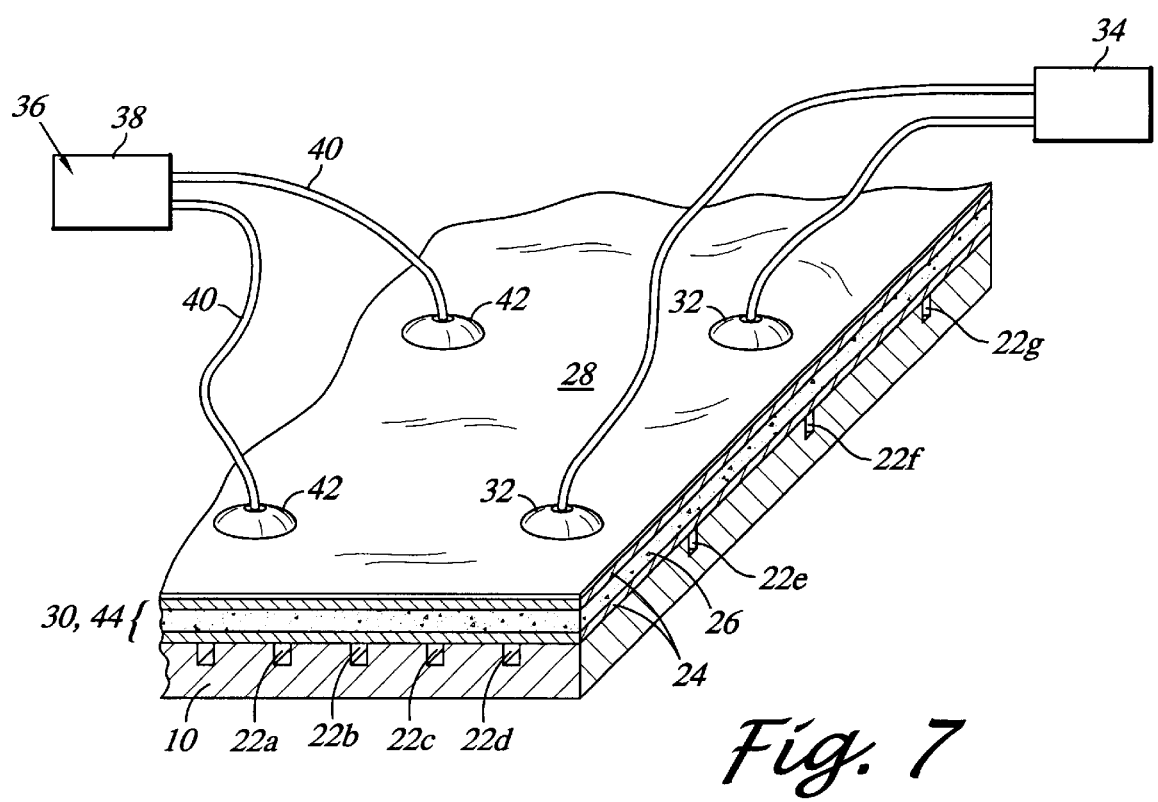
FIG. 7 is the improved mold apparatus of FIG. 2 shown with the fiber/core lay-up and flexible covering.

Referring now to FIGS. 5–7, a flexible, fluid impermeable bag or covering 28 is positioned atop the topmost fiber-reinforced ply 24. The periphery of the covering 28 is sealed against the mold surface 14 thereby bagging the fiber-reinforced plies 24 and core layers 26 therein. As such, a chamber 30 is formed between the covering 28 and the mold surface 14. A relative vacuum is drawn within the chamber 30 (i.e., between the mold 10 and the covering 26), thereby causing the covering 26 to compress and collapse against the fiber lay-up, according to those methods which are well known to one of ordinary skill in the art. In this respect, vacuum ports 32 may be selectively distributed about the mold 10. The vacuum ports 32 may be disposed through the covering 28 or at the periphery thereof. The vacuum ports 32 are in vacuum communication with a vacuum source 34. The vacuum ports 30 are preferably disposed adjacent the resin distribution conduits 22.

A chemically catalyzed liquid resin 36 is pumped from a resin source 38 through a series of resin supply lines 40. The resin supply lines 40 terminate at resin ports 42 which are selectively distributed about the mold 10. The resin ports 42 may be disposed through the covering 28 or at the periphery thereof. A multitude of individual resin supply lines 40 may be used so as to facilitate distributed wetting or infusion of the liquid resin 36 about the fiber reinforced plies 24. The resin, resin supply lines and resin ports 36, 40, 42 and the hardware facilitating the sealed delivery of the resin 36 into the chamber 30 are contemplated to be chosen from those which are well known to one of ordinary skill in the art.

As symbolically depicted in FIG. 6, dispensed resin 36 within the chamber 30 substantially fills the left portion of thereof as emanating form the resin port 42 towards the vacuum port 32. In this respect, the vacuum and resin ports 32, 42 are strategically positioned relative to one another in a manner which encourages controlled resin wetting. In this respect, the vacuum ports 32 may be applied at one portion of the mold 10 and the resin port ports 42 at an opposing portion. Upon introduction of the resin 36 into the bagged chamber 30, the resin 36 enters the resin distribution conduits 22 and locally wets or wicks the fiber-reinforced plies 24. The relative positioning of the vacuum and resin ports 32, 42 tend to cause the resin 36 to be pulled across and wet portions of the fiber-reinforced plies 24 therebetween. Significantly, the resin distribution conduits 22 facilitate distributed resin wetting. It is contemplated that the resin 36 tends to flow along paths of lesser fluidic resistance. In this respect, the resin 36 pooling within the resin distribution conduits 22 tend to flow more rapidly therewithin in comparison to resin flowing through the fiber-reinforcement plies along the mold surface 14. Thus, resin 36 tends to flow along the resin distribution conduits 22 and wet adjacent fiber-reinforcement plies 24.

Upon the fiber-reinforced plies 24 being sufficiently wetted or infused with resin 36, the resin 36 is allowed to cure, according to those methods which are well known to one of ordinary skill in the art. After the plies 24 have cured, the resultant fiber-reinforced resin structure 44 is removed from the mold 10. It is contemplated that in order to facilitate ease of such removal, a gelcoat of suitable material known to those of ordinary skill in the art may be applied to the mold 10 and resin distribution conduits 22 prior to the initial application of the fiber-reinforced plies 24.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A process for forming a fiber-reinforced resin structure against a mold surface by vacuum bag forming comprising:

(a) grooving the entire mold surface, including any planar- and irregular-shaped portions thereof, to form unobstructed resin distribution conduits therein extending thereacross, the resin distribution conduits being formed to intersect one another in a criss-cross pattern;

(b) distributing a fiber-reinforced ply adjacent the mold surface;

(c) placing a flexible covering over the fiber-reinforced ply and the mold surface to form a chamber therebetween;

(d) evacuating the chamber; and (e) dispensing resin through the flexible covering into the evacuated chamber such that the resin enters the resin distribution conduits flowing in an uninterrupted pattern and is thereby distributed across the entire mold surface about the ply.

2. The process of claim 1, wherein the step of grooving the mold surface to form resin distribution conduits further comprises a step of forming the resin distribution that are variably spaced from each other.

3. The process of claim 1, wherein the step of grooving the molding surface to form resin distribution conduits further comprises a step of forming substantially straight resin distribution conduits.

4. The process of claim 1, wherein the step of grooving the molding surface to form resin distribution conduits further comprises a step of forming the resin distribution conduits aligned in parallel and in spaced relation to one another.

5. The process of claim 1 wherein step (b) further comprises distributing a core material adjacent the fiber-reinforced ply.

6. The process of claim 1 further comprising:

(f) curing the resin distributed about the ply.

7. The process of claim 1 further comprising applying a gelcoat film to the mold surface prior to distributing the fiber-reinforced ply for facilitating removal of the resultant fiber-reinforced resin structure from the mold surface.

8. The process of claim 7 wherein the gelcoat film is applied within the resin distribution conduits.

9. In an apparatus for fabricating a fiber-reinforced resin structure including:

a flexible covering;

a mold surface formed to support a fiber-reinforced ply thereon and over which the covering may be placed to form a chamber therebetween, wherein the mold surface includes planar and irregular shaped regions conformal to a required shape of the fiber-reinforced resin structure;

a vacuum inlet for evacuating the chamber to collapse the covering against the ply and the mold surface;

an apparatus improvement comprising:

a plurality of unobstructed resin distribution conduits formed in both the planar and irregular shaped regions the mold surface for distribution of the resin in an uninterrupted pattern on said mold surface about the ply when the resin is dispensed into the evacuated chamber through the flexible covering, the resin distribution conduits being formed to intersect one another in a criss-crossed pattern.

10. The apparatus improvement of claim 9 wherein the resin distribution conduits comprise grooves.

11. The apparatus improvement of claim 9 wherein the resin distribution conduits are substantially straight.

12. The apparatus improvement of claim 9 wherein a portion of the resin distribution conduits are aligned parallel and in spaced relation to one another.

13. The apparatus improvement of claim 12 wherein the portion of the resin distribution conduits which are aligned parallel are spaced approximately six inches apart.

14. The apparatus improvement of claim 9 wherein the resin distribution conduits are variably spaced from one another.

15. The apparatus improvement of claim 9 wherein the resin distribution conduits have a rectangular cross-section.

16. The apparatus improvement of claim 9 wherein the resin distribution conduits have a rounded cross-section.

17. The apparatus improvement of claim 9 wherein the resin distribution conduits are formed to be approximately three-eighths inches deep.

18. The apparatus improvement of claim 9 wherein the apparatus further includes a resin port, and at least one of the resin distribution conduits is disposed adjacent the resin port.

19. The apparatus improvement of claim 9, further comprising a vacuum port and a plurality of resin ports, wherein the vacuum port is adjacent to one of the resin distribution conduits, and at least one of the resin ports is adjacent to one of the distribution conduits at a portion of the molding surface opposing to the vacuum port.

* * * * *